(12) United States Patent
Folta et al.

(10) Patent No.: US 6,634,760 B2
(45) Date of Patent: Oct. 21, 2003

(54) LOW-COST METHOD FOR PRODUCING EXTREME ULTRAVIOLET LITHOGRAPHY OPTICS

(75) Inventors: James A. Folta, Livermore, CA (US); Claude Montcalm, Fort Collins, CO (US); John S. Taylor, Livermore, CA (US); Eberhard A. Spiller, Mt. Kisco, NY (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/940,099

(22) Filed: Aug. 27, 2001

(65) Prior Publication Data

US 2003/0043483 A1 Mar. 6, 2003

(51) Int. Cl.$^7$ .................................................. G02B 5/08
(52) U.S. Cl. ........................................ 359/883; 428/635
(58) Field of Search ................................ 359/883, 884; 428/615, 635, 64

(56) References Cited

U.S. PATENT DOCUMENTS

| 4,857,373 A | * | 8/1989 | Carcia et al. ............. 346/135.1 |
| 5,082,709 A | * | 1/1992 | Suzuki et al. .............. 428/65.4 |
| 5,171,606 A | * | 12/1992 | Mayer et al. ................ 427/162 |
| 5,375,015 A | * | 12/1994 | Itoh et al. .................... 359/845 |
| 6,228,512 B1 | * | 5/2001 | Bajt et al. .................... 428/635 |

* cited by examiner

Primary Examiner—Euncha Cherry
(74) Attorney, Agent, or Firm—John P. Wooldridge; Alan H. Thompson

(57) ABSTRACT

Spherical and non-spherical optical elements produced by standard optical figuring and polishing techniques are extremely expensive. Such surfaces can be cheaply produced by diamond turning; however, the roughness in the diamond turned surface prevent their use for EUV lithography. These ripples are smoothed with a coating of polyimide before applying a 60 period Mo/Si multilayer to reflect a wavelength of 134 Å and have obtained peak reflectivities close to 63%. The savings in cost are about a factor of 100.

15 Claims, 3 Drawing Sheets

LOW-COST METHOD FOR PRODUCING EXTREME ULTRAVIOLET LITHOGRAPHY OPTICS

The United States Government has rights in this invention pursuant to Contract No. W-7405-ENG48 between the United States Department of Energy and the University of California for the operation of Lawrence Livermore National Laboratory.

BACKGROUND OF THE INVENTION

1. Field of the Invention

The present invention relates to thin-film coated optics, particularly to reflective multilayer-coated optics, and more particularly to a method of producing low-cost EUV optics.

2. Description of Related Art

Many applications, including extreme-ultraviolet (EUV) lithography, astronomy, microscopy, spectroscopy and related imaging techniques require thin-film coatings deposited with a highly controlled thickness distribution over curved optical surfaces of various sizes, shapes and figures. The thickness distribution required for a given optic can be obtained with several deposition techniques. For example, one can use a precisely shaped shadow mask in front of the optical surface or baffles may be place over the deposition sources to tailor the deposition flux distribution. One can also use velocity modulation techniques in which the optical surface to be coated is swept in front of the deposition source in a controlled manner. Numerous other methods using different approaches to get the required thickness distribution exist.

Optics meeting the aspheric figure and finish specifications of today's advanced optical systems can be extremely expensive. The cost of the condenser optics in an EUV stepper has been very high., especially since it is the lifetime of these mirrors is limited by the radiation and debris from the laser plasma source. The cost of the mirrors obtained up to now is around $500,000 with barely acceptable roughness. Diamond-turned mirror substrates made of Al can be obtained at a small fraction of this cost with a figure well within the specification; however the finish is not sufficiently smooth to allow deposition of multilayer coatings which have high reflectance at EUV wavelengths.

SUMMARY OF THE INVENTION

It is an object of the present invention to provide a method for making a mirror substrate using an inexpensive fabrication technique and then depositing a smoothening overcoat layer on the substrate to obtain a required surface smoothness.

It is another object to form a condenser mirror for use in an EUV lithography process, wherein the mirror is formed on an inexpensively fabricated substrate and then depositing a smoothening overcoat layer on the substrate to obtain a required surface smoothness.

These and other objects will be apparent to those skilled in the art based on the disclosure herein.

Spheric and aspheric precision mirrors with a surface finish in the Angstrom range are very expensive when produced by optical polishing and figuring. For example a set of mirrors for the C1 condenser of the EUV stepper of the EUV LLC costs close to $500,000. Diamond turning of metals, on the other hand, can produce aspheric mirrors with good figure at a much lower price (around $1000), but with a finish (roughness around 0.1 micron) that does not permit deposition of high reflectance multilayer coatings. In the present invention, applying a coating starting from a liquid by spin- or dip-coating can smooth diamond turned aluminum mirrors. This film and the reflecting multilayer on top of it can later be removed chemically to make the substrates available for a fresh coating. Due to the low price of diamond turned optics one can also consider replacing the entire condenser optics with a new one on a regular schedule. This can reduce the cost of ownership of EUV lithography tools A version of this invention was used to produce low-cost surrogates required for the development of the deposition processes of high-precision thin film coatings. It has significantly lowered the cost of developing the multilayer coating processes of various extreme-ultraviolet lithography optics. The present invention is useful for fabricating condenser mirrors for the ETS EUV (Engineering Test Stand extreme-ultraviolet) stepper. EUV lithography is expected to have a significant impact on the further miniaturization of electronic devices, which would have defense applications in addition to business and domestic applications. Also, this invention is useful in applications that require optical systems with thin-film-coated optics, like those used in the National Ignition Facility (NIF).

Several fields of technological and scientific importance require optical systems with reflective optics. This method can be used to develop precision multilayer coatings for EUV lithography and precision graded optical coatings for general applications. In addition, these mirrors are used for x-ray laser cavities and optics, optics for light sources including laser-produced plasmas and synchrotrons, and also as optics for x-ray microscopy and astronomy.

The use of spin- or dip coated films to smooth the surface of an optic to sub-nanometer RMS level is probably new.

The use of aluminum mirrors fabricated to the right spheric or aspheric shape with a diamond turned technique and smoothed out with a spin- or dip coated film layer to improve the surface finish and make it acceptable for EUV reflectors is definitely new The present invention provides a solution to the above-mentioned problem of high cost mirrors for the process development of precision thin film coatings. This invention involves a method that provides a re-usable mirror made of aluminum with a relatively inexpensive fabrication technique. The method consists of fabricating the aluminum mirror with a metal machining technique to get the desired substrate figure and to coat the mirror with a smoothening layer of material to obtain the desired surface smoothness. The key of this invention is to deposit a thin layer that will improve the smoothness of the surface to sub-nanometer root-mean-square (RMS) roughness levels. The invention has been experimentally verified with diamond-turned aluminum mirrors that were coated with a layer of standard microelectronic photoresist. It has been shown that these photoresist-coated diamond turned aluminum mirrors can be used, and re-used, in the several iterative steps of the development of the deposition processes for high-reflectance multilayer coatings for EUV lithography optics. Photoresist has been chosen for this application because of the ease of using acetone to remove the film and the coating placed on the film.

Polyimide has been tested as a smoothing layer for the possible application in cheap, possibly throwaway replacement mirrors for illumination (condenser) systems in EUV steppers. Polyimide has considerably higher radiation, thermal and chemical stability and compatibility with a high vacuum environment as compared to photoresist. Another attractive candidate is spin-on glasses, but those have not been tested.

DETAILED DESCRIPTION OF THE PREFERRED EMBODIMENTS

The present invention is a method for producing low-cost EUV lithography mirrors. This is accomplished by fabricating the optic substrate with standard or high-precision machining techniques and by depositing a smoothening overcoat layer onto the substrate to obtain the required surface smoothness. With a smoothening layer soluble in acetone or other solvent, the coating can be stripped and the optic re-used. Thus, by providing a simple and cost effective method to produce re-usable mirrors required for the development of the final deposition process for expensive optics, the cost of producing such optics is greatly reduced. The low cost of diamond turned optics also makes it possible to replace these mirrors with new ones in an environment where radiation induced damage is a concern as in a EUV stepper.

Figure 1:
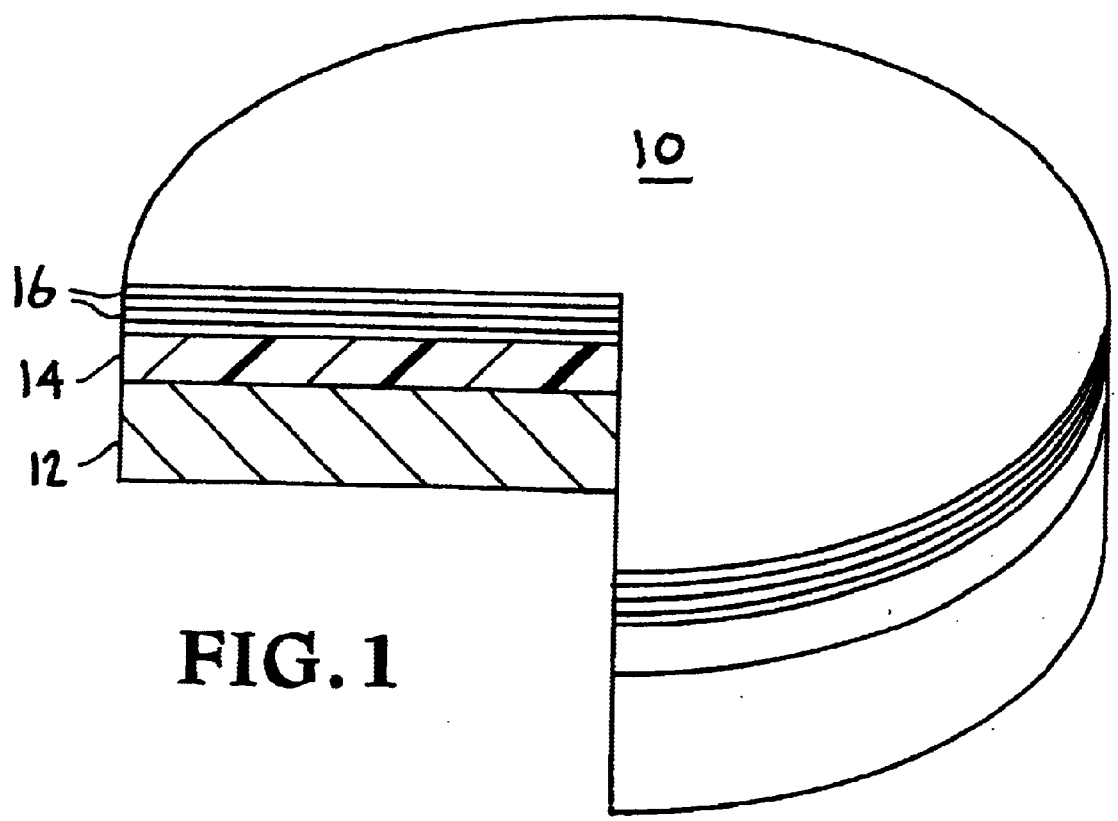
FIG. 1 is a schematic of a 25 mm diameter by 0.25 mm thick disk surrogate fabricated for the proof-of-concept tests.
Figure 2:
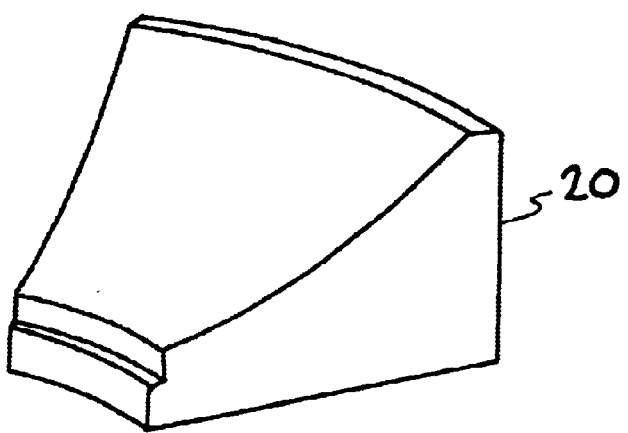
FIG. 2 is a schematic of a EUV lithography condenser optic.

Simple disks (25 mm diameter by 5 mm thick) were fabricated for proof-of-concept experiments (FIG. 1). Several mirrors were also fabricated of a highly curved aspheric optic for a EUV lithography condenser system (FIG. 2). Due to the large aspheric departure of the figure, the cost to fabricate mirrors of the latter optic with conventional optical polishing techniques was a significant fraction of the high cost of fabricating the optic; even with relaxed tolerances, the cost was approximately $80K The material used for the fabrication of both types of mirrors was aluminum because this material is inexpensive, easy to machine, and is vacuum compatible. Either a standard machining technique or a high-precision diamond-turning technique was used to fabricate the mirrors. The diamond turning technique produces more precise figures and smoother surfaces. A layer of photoresist was used to improve the mirror smoothness so that a high reflectance multilayer coating could be deposited. While several types of polymer materials can be used as a smoothening layer, a photoresist layer can be easily dissolved in acetone so the multilayer coating can be removed from the mirror, which can be re-used for another deposition iteration. Several simple and inexpensive methods can be used to apply the photoresist layer onto the mirror.

For the disk that was used, standard spin coating was used where a small quantity of photoresist (Hoechst AZ 5206-E) was poured onto the surrogate spinning at 2000 rpm for 1 min. The centrifugal effect thins down the photoresist layer to a relatively uniform thickness of approximately 1 $\mu$m. For the second case, a newly developed technique was used consisting of dipping the surrogate into a photoresist solution (Shipley SP2029-1) and removing it from the solution at a steady rate of ~3 cm/min. Dip coating was used because the very curved and asymmetrical shape of the surrogate did not allow easy balancing of the optic required for the more standard spin coating method. Spin-coated polyimide on diamond turned Al disks and on Si wafers was used to test the idea of inexpensive, stable replacement optics.

Figure 3:
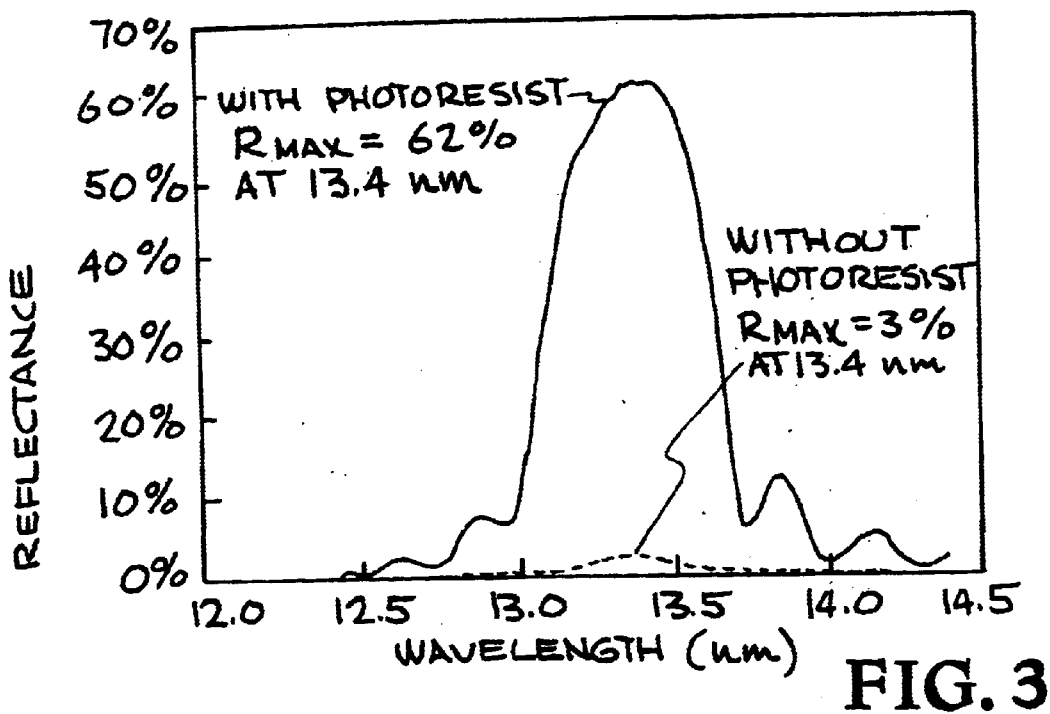
FIG. 3 shows reflectance of a molybdenum-silicon multilayer coating as a function of wavelength as deposited on disk surrogates with and without a photoresist smoothening layer.
Figure 4:
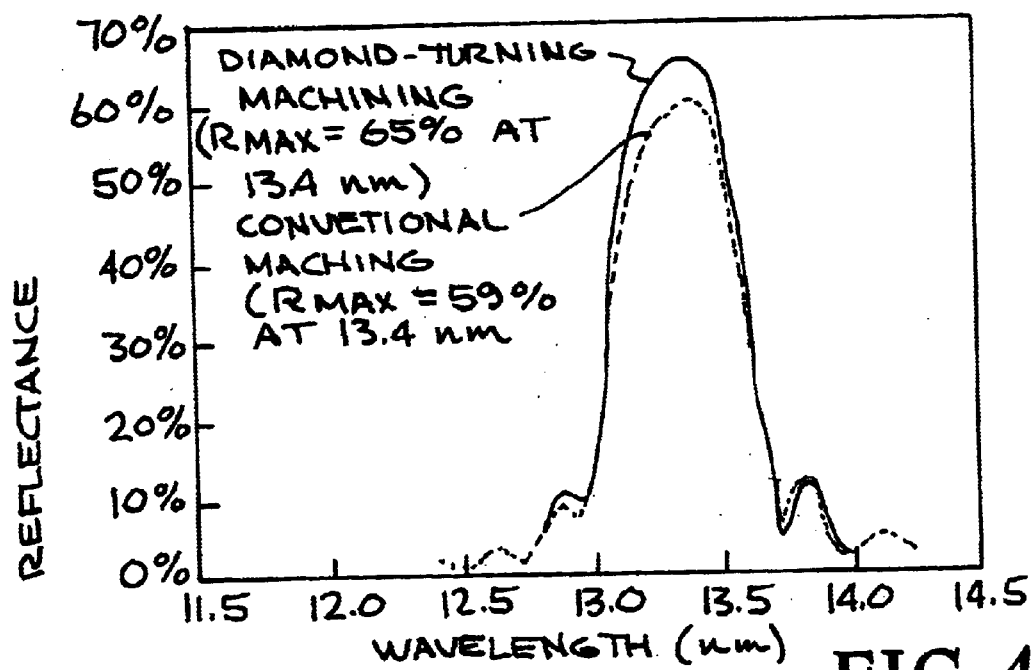
FIG. 4 shows reflectance of a molybdenum-silicon multilayer coating as a function of wavelength as deposited on EUV lithography condenser optic surrogates fabricated with: (1) a conventional machining and polishing technique; and (2) a diamond-turning technique. Both surrogates were smoothed with a photoresist layer.

In the first experiment, two diamond-turned aluminum disks were used, one without any smoothening layer and the other one with a layer of photoresist A typical high-reflectance molybdenum-silicon multilayer mirror was deposited on each disk and the multilayer reflectance was measured at near-normal incidence (5 degrees) in the EUV wavelength range of interest (12 to 14 nm) (FIG. 3). The reflectance of the multilayer deposited onto the disk without photoresist smoothening layer was only 3%, which is typical of a multilayer deposited on a rough surface. The reflectance of the multilayer deposited onto the photoresist-coated disk was 62%, which is near the typical 67% reflectance achieved for multilayers deposited on ultrapolished surfaces. In the second experiment two mirrors of an actual EUV lithography optic were fabricated (one optic as shown in FIG. 2) with two different methods, one with a conventional machining technique followed by a simple polishing, and the other one with a diamond-tuning technique. Both surrogates were first coated with a layer of photoresist using the dip coating technique mentioned above, and then coated with a standard high-reflectance molybdenum-silicon multilayer mirror. The reflectance achieved in both cases was near the standard reflectance of 67% achieved on ultrapolished substrates, i.e., 59% and 63% for the conventionally machined and diamond-turned surrogates, respectively (FIG. 4). Both experiments demonstrate the smoothening effect of the photoresist layer and show that aluminum mirror substrates fabricated with a variety of machining techniques can have performances similar to the state-of-the-art optics.

Several other EUV condenser surrogates were then fabricated with the diamond-turning technique and used for the development of the deposition process of the reflective multilayer coating. Five iterations were necessary to obtain a process leading to the required uniform wavelength response of the multilayer reflectance as a function of the radial position on the surrogate. The cost of the mirrors was a tenth of the cost of mirrors fabricated by conventional polishing technique and led to the same high-quality result.

For the test of a smoothing layer of polyimide, six flat Al disks with 54 mm diameter with a finish of 0.6 micron peak to valley were used. These disks were coated with various polyimide films with thicknesses between 0.5 and 10 micron and then used as substrates for Mo/Si multilayers. Table 1 lists the parameters of these coatings.

TABLE 1

Polyimide Studies on 2" Al Flats

| TEST | Deposition | centr | $R_{max}$ (%) | Comment |
|---|---|---|---|---|
| 1 | M1-001114B1 | 134.03 | 61.5 | 0.1 degree halo |
| 2 | M1-001114B1 | 134.13 | 61.7 | 0.1 degree halo |
| 3 | M1-001114B1 | 134.12 | 60.6 | 0.1 degree halo |
| 4 | M1-001114B2 | 133.91 | 60.9 | 0.1 degree halo |
| 5 | M1-001114B2 | 133.72 | 62.0 | No haze |
| 6 | M1-001114B2 | 133.73 | 62.0 | No haze |

In the table, Durimide 285 with a thickness of 1.3 microns was used for tests 1 and 2. Durimide 285 with a thickness of 0.5 microns was used for tests 3 and 4. Durimide 9753 with a thickness of 10 microns was used for tests 5 and 6. It appears that the 10 micron thick films (SN 5 and 6) produce the best smoothing and the least amount of scattering.

As briefly discussed above, FIG. 1 shows a schematic of the 25 mm diameter by 0.25 mm thick disk mirror 10 fabricated for the proof-of-concept tests. The inset shows an aluminum piece machined 12 with a diamond-turning technique, a photoresist layer 14 that smoothes down the aluminum surface, and a high-reflectance molybdenum-silicon multilayer coating 16.

FIG. 2 shows a schematic of a EUV lithography condenser optic 20. This is only one of the six petals that constitute the whole condenser optic. The optic was fabricated with the required aspheric figure with a diamond-turning technique and coated with a photoresist layer prior to depositing a high-reflectance molybdenum-silicon multilayer coating onto the surface of the optic.

FIG. 3 shows reflectance of the molybdenum-silicon multilayer coating as a function of wavelength as deposited on disk surrogates with and without a photoresist smoothening layer. The photoresist coating improved the smoothness of the aluminum surface significantly.

FIG. 4 shows reflectance of the molybdenum-silicon multilayer coating as a function of wavelength as deposited on EUV lithography condenser optic surrogates fabricated with a conventional machining and polishing technique; and a diamond-turning technique. Both surrogates had a photoresist smoothening layer and a slightly higher reflectance was measured for the diamond-turned surrogate because of the smoother surfaces generated with this technique.

Commercially available (Durimide 285 from Arch Chemicals) was applied to the surface of the diamond-turned aluminum by spinning at 800 rpm and subsequent baking at 240° C. (final film thickness about 2 $\mu$m). An adapter was made to provide balance during the spinning operation to compensate for asymmetry of the C1 mirrors. Mirrors were mounted on a wedge with 23° tilt to bring the center of the mirror to horizontal position, and extensions of the mirror were mounted on each side of a segment to prevent the loss of liquid on the side before the corners were covered.

It should be noted that other materials are suitable to act as the smoothening layer, e.g., spin-on. Additionally, a radiation protective layer may be placed on the smoothening layer and/or on the multilayer coating.

The ability of the smoothing layers to smooth out the mid-spatial frequency "ripples" from the machining process was also tested. The test measured how reflected light is either scattered in a halo or shifted from the specular reflection angle. The results are summarized in Table 2, which gives the steepest slope angle and an average slope angle of the polyimide coating and the image shift produced by the average slope angle in a distance of 1 m. The last column gives the extent of a halo in radial direction observed in EUV light after the multilayer was applied. The values are for the halo size at a position of 93 mm from the axis of the parent optics. The size of this halo is in agreement with the value estimated from the slope variations at the top of the coating caused by the groves from the diamond turning. These grooves have a period around 12 $\mu$m and rms heights of 6 nm before and 2.7 nm after coating (observed in a ZYGO Mirau interferometer). The rms slope of about 0.2 mrad after coating is in agreement with the size of the halo in the last column of Table 2. The slope error due to the grooves is larger than the average slope error caused by the non-uniformity of the polyimide thickness.

TABLE 2

| Mirror ID | Steepest slope (mrad) | average slope (mrad) | image shift (mm) | halo size (°) |
|---|---|---|---|---|
| C1-A | 0.035 | 0.01 | 0.02 | 0.25 |
| C1-B | 0.055 | 0.03 | 0.06 | 0.15 |
| C1-C | 0.1 | 0.01 | 0.02 | 0.2 |
| C1-D | 0.1 | 0.016 | 0.032 | 0.1 |
| C1-E | 0.06 | 0.006 | 0.012 | 0.1 |
| C1-F | 0.16 | 0.01 | 0.02 | Too weak |

The Mo/Si multilayer was produced in the MAG-1 coating system and the desired coating thickness profile was generated by varying the speed of the platter that moved the optics over the magnetron sources. The recipe for this speed modulation is given in Table 3.

TABLE 3

| | Si layers | | Mo layers | |
|---|---|---|---|---|
| $v_0$: | 08434 rpm | 0–17.6° | 0.7870 rpm | 0–17.6° |
| $v_1$: | 0.866 $v_0$ | 18.6–34° | 0.866 $v_0$ | 18.6–34° |
| $v_2$: | 0.826 $v_0$ | 35–51.7° | 0.826 $v_0$ | 35–51.7° |
| $v_3$: | 0.603 $v_0$ | 52.7–80° | 0.603 $v_0$ | 52.7–80° |

Figure 5A:
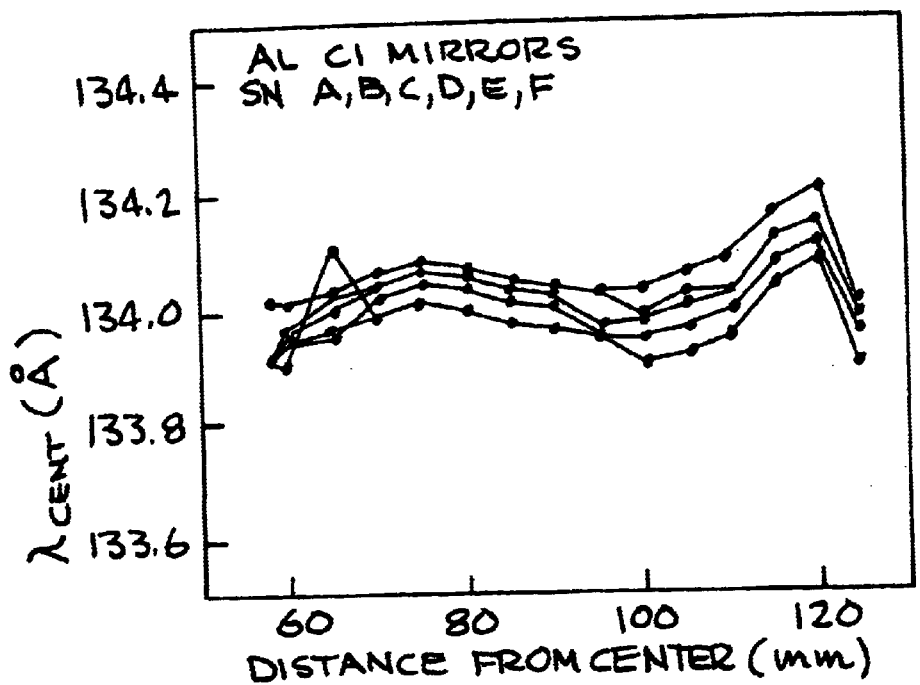
FIG. 5A shows the measured centroid wavelength for six polyimide-smoothed, multilayer-coated C1 condenser mirrors as a function of distance from the optical axis.
Figure 5B:
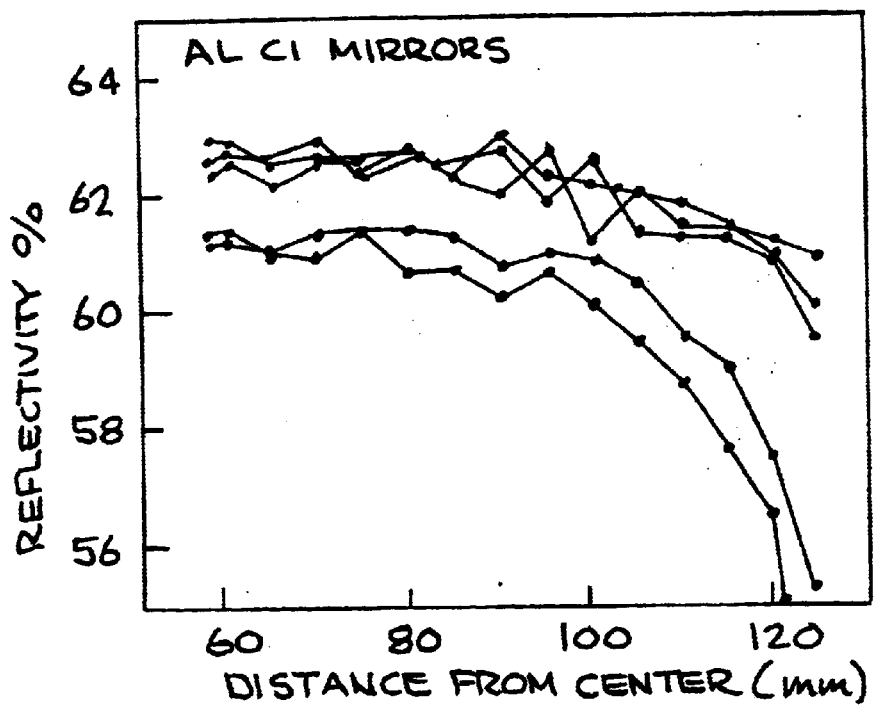
FIG. 5B shows peak reflectivity of five polyimide-smoothed, multilayer-coated C1 condenser mirrors for different distances from the axis.

FIGS. 5A and 5B show the performance of the multilayer coatings in the EUV. The reflectivity R($\lambda$) curves for different distances were measured from the optical axis at the incidence angles at which each mirror is illuminated at that location in the ETS condenser. The incidence angles vary between 12 and 28° and the multilayer period is made thicker for larger distances from the center in order to reflect at the same wavelength for all locations. A variation in the wavelengths of 0.5 Å from the desired value keeps the peak reflectivity above 99% of its maximum.

The reflectivity of the best three mirrors is between 62 and 63%. There is a large variation in the reflectivity of the mirrors. The mirror substrates as obtained were not pristine but had been used previously for various experiments and some had been contaminated with glue, organic coatings and other unknown contaminants. Mirror C1-F was cleaned with a chemical etch before the polyimide was applied and this etch process resulted in a lower reflectivity around 30%.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for making an extreme ultraviolet lithography mirror, comprising:
    producing an extreme ultraviolet lithography mirror substrate comprising aluminum;
    depositing a smoothening overcoat layer on said mirror substrate to obtain a required surface smoothness; and
    depositing a reflective optical coating onto said smoothening overcoat layer.

2. The method of claim 1, wherein said smoothening overcoat layer comprises polyimide.

3. The method of claim 1, wherein said smoothening overcoat layer comprises photoresist.

4. The method of claim 1, wherein said smoothening overcoat layer comprises glass.

5. The method of claim 1, wherein said smoothening overcoat layer is deposited by spin coating.

6. The method of claim 1, wherein said smoothening overcoat layer is deposited by dip coating.

7. The method of claim 1, wherein said smoothening overcoat layer is soluble in a solution selection from a group consisting of a solvent, an acid, and a caustic.

8. The method of claim 1, wherein said substrate is fabricated by diamond turning.

9. The method of claim 1, wherein said reflective optical coating comprises a molybdenum-silicon multilayer coating.

10. The method of claim 1, wherein said substrate is selected from the group consisting of a spheric substrate and an aspheric substrate.

11. An extreme ultraviolet lithography mirror, comprising:

an extreme ultraviolet lithography mirror substrate comprising aluminum;

a smoothening overcoat layer on said mirror substrate to obtain a required surface smoothness; and a reflective optical coating on said smoothening overcoat layer.

12. The apparatus of claim 11, wherein said smoothening overcoat layer comprises material selected from the group consisting of polyimide, photoresist and glass.

13. The apparatus of claim 11, wherein said smoothening overcoat layer is soluble in a solution selected from the group consisting of a solvent, an acid and a caustic solution.

14. The apparatus of claim 11, wherein said reflective optical coating comprises a molybdenum-silicon multilayer coating.

15. The apparatus of claim 11, wherein said substrate is selected from the group consisting of a spheric substrate and an aspheric substrate.

* * * * *